INVENTORS
Jan A. Rajchman
& George R. Briggs
ATTORNEY

Aug. 18, 1959  J. A. RAJCHMAN ET AL  2,900,622
FERROELECTRIC SYSTEMS
Filed May 31, 1955                                    2 Sheets-Sheet 2
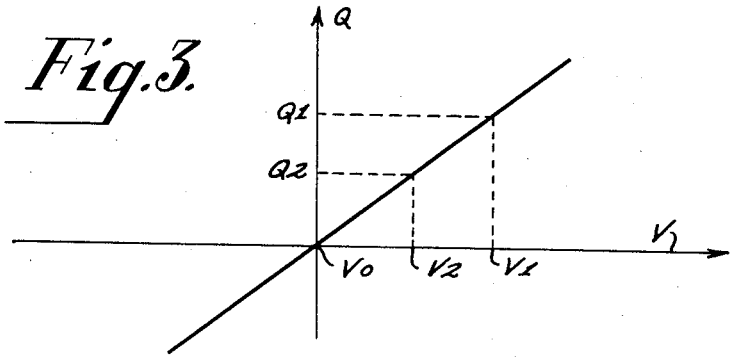
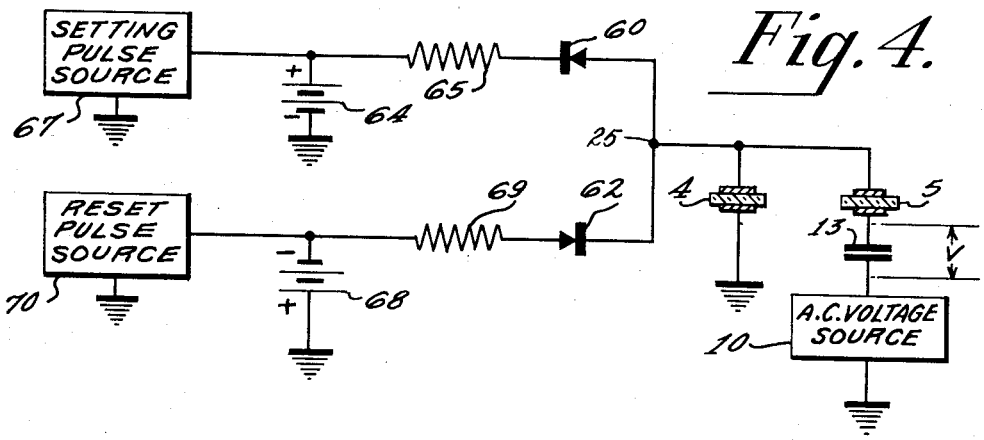
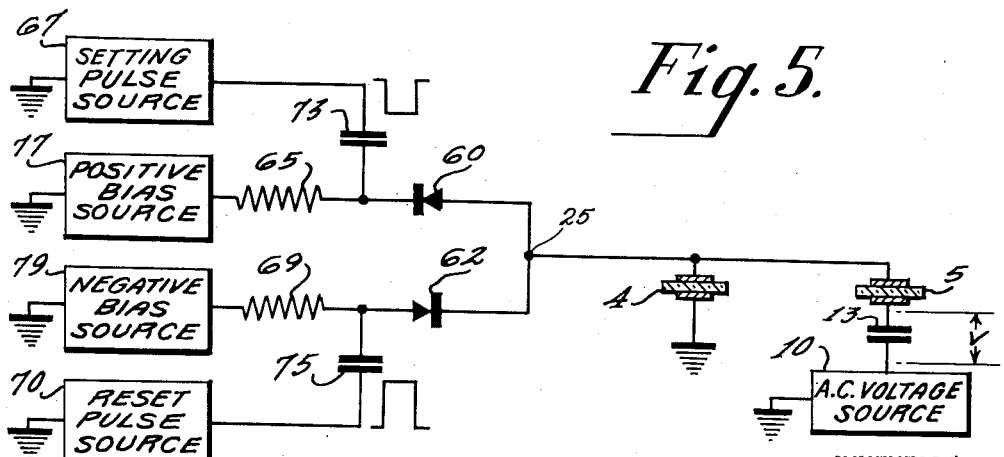
INVENTORS.
Jan A. Rajchman
& George R. Briggs
BY
ATTORNEY.

12,900,622
Patented Aug. 18, 1959

2,900,622

FERROELECTRIC SYSTEMS

Jan A. Rajchman and George R. Briggs, Princeton, N.J., assignors to Radio Corporation of America, a corporation of Delaware Application May 31, 1955, Serial No. 511,915

16 Claims. (Cl. 340—173)

This invention relates to ferroelectric systems, and particularly to means for and methods of controlling electrical signals by means of such systems.

Ferroelectric materials exhibit a hysteretic effect when an alternating voltage is applied across the materials. For certain of these, such as barium titanate, the hysteresis loops, more particularly defined hereinafter, are substantially rectangular and of the general form exhibited by certain ferromagnetic materials, such as manganese-magnesium ferrite. One loop, called the major loop, is that approached as a limiting curve by increasingly large values of applied alternating voltage. There is a family of minor loops, each similar to the major loop on a smaller scale, and each reflecting the shape of the major loop.

It is known to connect two similar ferroelectric condensers in series with each other in an electrical circuit. The pair of condensers may then be polarized in opposite directions by applying a voltage thereto. Another voltage source is arranged for applying pulses selectively to one of the condensers without changing the direction of polarization of the other condenser, thereby storing information in the pair. The stored information may represent, for example, a binary digit. Information is read out by applying pulses alternating in polarity to the condensers in series. The first pulse of one polarity reads out the stored information and the second, opposite-polarity pulse restores the information read out. Thus, information can be repeatedly read out of the device without being destroyed.

It is an object of the present invention to provide an improved electrical system employing ferroelectric elements whereby power or electrical signals representing, for example, information, intelligence, or the like can be controlled in accordance with a single, electrical setting impulse.

Another object of the present invention is to provide an improved electrical system and method of operation thereof for controlling electrical signals in such a manner that no holding power is required in the exercise of the control.

Still another object of the present invention is to provide an improved electrical device for controlling electrical power through the use of control levels which are variable throughout a continuous range and of which a selected control level corresponds to one of a plurality of setting pulses.

A still further object of the present invention is to provide an improved electrical system utilizing ferroelectric elements for storing information.

Yet another object of the present invention is to provide an improved storage device and method of operation thereof for storing information by means of ferroelectric elements.

According to the invention, use is made of an electrical system which includes two ferroelectric condensers connected electrically in series. A setting means and a reset means are each connected to a common junction point between the two ferroelectric condensers. The reset means applies a saturating voltage to the condensers to saturate them with charge in one, or the same direction with reference to the junction point intermediate the condensers. The setting means selectively applies setting impulses of various wave shapes to the condensers to change the charge of at least one of the condensers. The amount by which the charge changes is controlled by the wave shape, and more particularly by either the amplitude or the duration of the setting impulse, or by a combination of both. A voltage alternating in polarity is connected across the two condensers. Each phase of the A.C. voltage causes an interchange of charge, which may be zero, between the two condensers, depending on the previous setting impulse. For one amplitude setting impulse there is a complete interchange of charge between the two condensers. The amount of charge interchange can be varied in a continuous range from a complete interchange of charge to a zero interchange of charge by varying, for example, the amplitude of the setting impulse in a corresponding range.

By connecting an output element to the condensers, a useful output A.C. signal can be obtained. Once the system has been set by a setting impulse, no holding power is required to maintain the setting. Thereafter, output signals can be obtained for an indefinitely long time, corresponding to the one setting, until a different setting impulse is applied.

The system of the present invention may be employed advantageously for storing binary encoded information. The reset voltage may be designated arbitrarily as corresponding to a binary zero, for example. In such case, for a binary zero condition, substantially no output signal is produced by the A.C. voltage. A suitable amplitude setting impulse can then correspond to a binary one and, in the latter case, the A.C. voltage produces a relatively large output signal.

The invention will be more fully understood, both as to its organization and method of operation, from the following description, when read in connection with the accompanying drawing in which similar reference characters refer to similar parts throughout and in which:

Fig. 3 is a graph showing the relationship between the output voltage of the system of Fig. 1 and the change of charge on the ferroelectric elements;

Fig. 4 is a schematic diagram of a second form of electrical system according to the present invention, this form employing but two ferroelectric elements, and Fig. 5 is a schematic diagram of a third form of electrical system according to the present invention and wherein the setting impulses are applied through a capacity unit.

Figure 1:
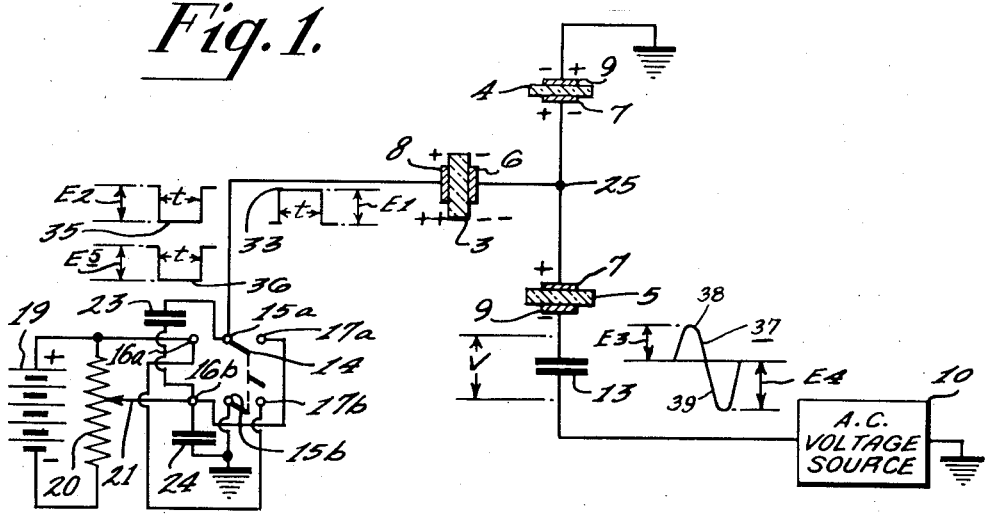
Fig. 1 is a schematic diagram of one form of electrical system in accordance with the present invention in which three ferroelectric elements are employed.

Referring to Fig. 1, there are shown a pair of ferroelectric condensers 4 and 5 each having electrodes 7 and 9, the condensers being connected in series by connecting together at a junction 25 one electrode 7 of each condenser. An output element, shown as a capacitor 13, has one terminal connected to the other electrode 9 of the condenser 5. An A.C. voltage source 10 is connected across the two ferroelectric condensers 4 and 5. The A.C. source 10 is connected to a common ground, indicated by the conventional ground symbol. The electrode 9 of the condenser 4 is connected to the common ground. A third ferroelectric condenser 3 has one electrode 6 connected to the junction point 25 between the condensers 4 and 5. The other electrode 8 of the condenser 3 is connected to one movable contact 15a of the pair of movable contacts 15a, 15b of a reversing switch 14. The other movable contact 15b is connected to ground. The fixed contacts 16a, 16b and 17a, 17b of the switch 14 are connected across a voltage source comprising a battery 19 and a potentiometer 20. The contacts 16a, 17b are connected to one end of the potentiometer 20 and the contacts 16b, 17a are connected to its movable arm 21. A pair of capacitors 23, 24 connect the fixed contact 16b to the movable contacts 15a, 15b, respectively. The latter two capacitors functions to maintain the amplitude of the voltage supplied by the voltage source at a constant level during the opening of the reversing switch 14.

Figure 2:
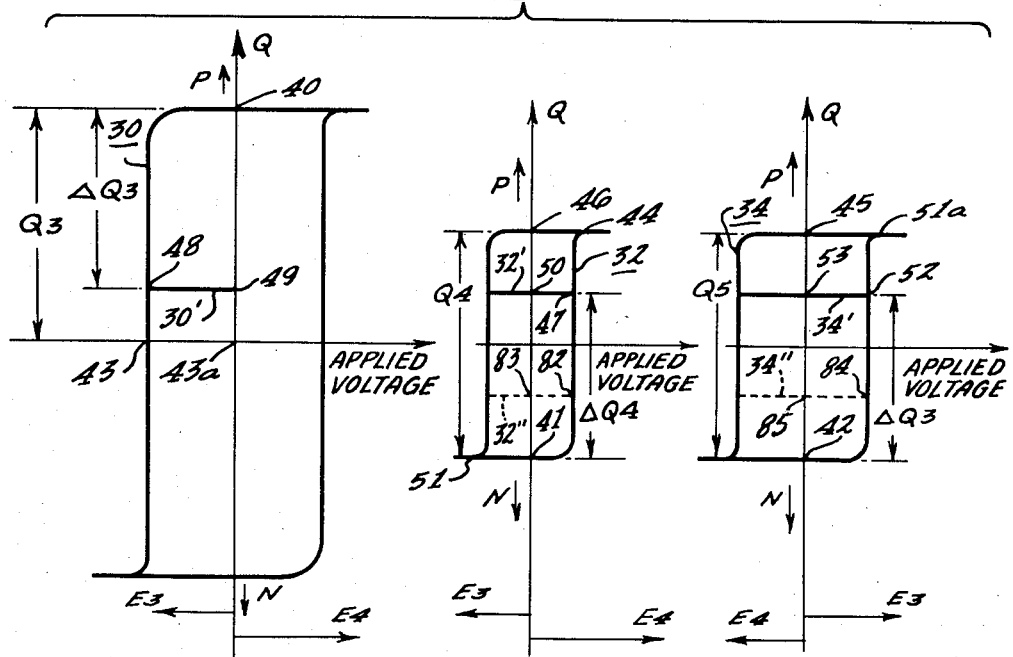
Fig. 2 is a graph showing a set of hysteresis loops, somewhat idealized, each corresponding to one of the ferroelectric elements of Fig. 1.

An explanation of the operation of the system of Fig. 1 may be offered in connection with the hysteresis loops 30, 32 and 34 of Fig. 2 which represent the charge characteristics of the condensers 3, 4 and 5, respectively, of Fig. 1. Each hysteresis loop comprises a plot of the relation between the voltage applied across the electrodes of the respective condensers and the resulting integrated charge "Q" which passes through the condenser. The hysteresis loops for actual ferroelectric materials deviate somewhat from the idealized shapes shown. However, these ideal loops are accurate enough for purposes of explanation and are used as a matter of convenience.

Before consideration of the circuit of Fig. 1, it may be recalled that, in general, a current $i$ as a function of time $t$ is caused to flow through a condenser when a voltage V is applied across the condenser. In any given interval of time $\Delta t$, a charge Q expressed as (1) $\qquad Q = \int_{\Delta t} i \, dt$ may be thought of as having passed through the condenser. This charge Q may be related, with the aid of Maxwell's equations, to the electric displacement D, a vector P called the polarization vector, the electric field E, and the current density $j$ between the elements or plates of the condenser. Although fundamental physical meanings may be ascribed to electrical polarization and electrical displacement, these meanings need not be introduced for an understanding of the present invention. A satisfactory explanation of the invention may be afforded by reference only to the charge "Q" as defined by Equation 1.

Each hysteresis loop of Fig. 2 may be considered a plot of the charge "Q" which has passed through the corresponding condenser as a function of the applied voltage producing the charge. The first time a voltage is applied to an element, before it is polarized, the curve of charge against voltage may start at the origin. However, thereafter, a hysteresis loop would be followed. The value of voltage V across an element at which the charge Q is zero is called the "coercive" voltage. The corresponding field is called a "coercive" field. The element may be restored to a state corresponding to zero charge and zero voltage. However, in general, after a voltage is applied, the state or condition of the element is represented by a point on one of the hysteresis loops.

In Fig. 2, the coercive voltage of the loop 30 is shown to be greater than that of either of the loops 32 and 34. The coercive voltage of the loop 34 is shown to be greater than that of the loop 32. Increased values of coercive voltage can be obtained by increasing the thickness of the dielectric material of a condenser. Alternatively, different values of coercive voltage can be obtained by employing different ferroelectric materials as the dielectrics for the different condensers. For example, in the embodiment of Fig. 1, the thickness of the dielectric material of the third condenser 3 is greater than the thickness of the dielectric material of both the first condenser 4 and the second condenser 5; and the thickness of the dielectric material of the second condenser 5 is greater than that of the first condenser 4. Also, the charge flowing through the third condenser 3, when it is driven from one extreme, remanent condition to the other, is at least equal to the sum of the charges flowing through the first and second condensers 4 and 5 when they are driven from the other to the one, extreme, remanent condition. The larger charge capacity of the condenser 3 is indicated by the larger ordinal distance of the loop 30. A larger charge capacity can be obtained by making the area of the condenser 3 greater than that for both the condensers 4 and 5. The charge capacities for the condensers 3 and 4 are made approximately the same.

In operation, assume that a positive reset pulse 33 having an amplitude E1 and a duration $t$ is applied to the condensers. The reset pulse 33 is obtained by first throwing the movable arm of the switch 14 to the left (as viewed in the drawing), allowing the switch to remain closed for the time $t$ and then returning the arm to the open position. The amplitude E1 of the reset pulse 33 is obtained by suitably positioning the arm 21 of the potentiometer 20. The amplitude "E1" of the pulse 33 is sufficiently large to produce a saturating voltage across the third and second condensers 3 and 5 and across the third and first condensers 3 and 4. The third condenser 3 is saturated with charge in one direction (for example, the direction arbitrarily designated as "P" [positive] with reference to the junction point 25). Each of the first and second condensers 4 and 5 is saturated with charge in the other direction arbitrarily designated "N" [negative] with reference to the junction point 25. The polarities are indicated in Figure 1 by two + and two − signs adjacent and below the third condenser 3, and single signs adjacent and to the left of the first and second condensers 4 and 5. Two different + and two different − signs are shown adjacent the third condenser 3 to indicate, qualitatively, that the third condenser 3 has a greater amount of charge than either of the first two condensers 4 and 5.

Assume, now, that the A.C. source 10 is operated to produce a cycle of voltage 37 across the first and second condensers 4 and 5. The two phases of the voltage waveform 37 may be symmetrical with the amplitude E3 of the positive phase 38 equal to the amplitude E4 of the negative phase 39. The voltage waveform 37 may also be asymmetrical with the amplitude E4 of the negative phase greater than the amplitude E3 of the positive phase, as described hereinafter. In the reset condition, neither the positive phase 38 nor the negative phase 39 produces a change of charge in the first two condensers 4 and 5. No change of charge is produced by the positive phase 38 because the first condenser 4 is already saturated with charge in the positive direction with reference to the source 10. Similarly, no change of charge is produced by the negative phase 39 because the second condenser 5 is already saturated with charge in the negative direction with reference to the source 10. Repeated cycles of the voltage waveform 37 produce substantially no change of charge in the condensers 4 and 5. Consequently, no current flows from a source 10 through the condensers.

Consider the effect of applying a negative control or setting pulse 35 having an amplitude E2 and a duration $t$. The setting pulse 35 is obtained by throwing the movable arm of the switch 14 to the right, as viewed in the drawing, allowing the switch to remain closed for the time $t$, and then returning the arm to an upright position. The desired amplitude E2 is obtained by adjusting the arm 21 of the potentiometer 20. The amplitude E2 of the setting pulse 35 is made sufficient to exceed the sum of the coercive voltages of the third and first condensers 3 and 4, but insufficient to exceed the sum of the coercive voltages of the third and second condensers 3 and 5. The setting pulse 35, therefore, changes the direction of charge in the condenser 4 from saturation in the N direction to saturation in the P direction with reference to the junction point 25. The polarity of the charge stored in the condenser 4, as changed by the setting pulse 35, is indicated by the + and − signs adjacent and to the right of the first condenser 4. The amount of charge in the third condenser 3 is reduced by an amount equal to the total changed charge in the first condenser 4. The reduced charge in condenser 3 is indicated by the single + and − signs adjacent and above the third condenser 3, compared to the two signs below the condenser 3. The first two condensers 4 and 5 are now saturated with charge in the same direction with reference to the A.C. voltage source 10. Upon application of the first positive phase 38 of the waveform 37, the direction of charge in the first and second condensers 4 and 5 is reversed, and a substantial current flows in the series circuit including the capacitor 13. The negative phase 39 of the waveform 37 again reverses the direction of charge in the first two condensers 4 and 5 back to the initial direction, and again a substantial current flows in the series circuit including the capacitor 13. Repeated cycles of the waveform 37 produce a substantial current in the series circuit. Each time the direction of charge in the first two condensers 4 and 5 is reversed, an output voltage V appears across the capacitor 13. The system of Fig. 1 can be reset by operating the switch 14 to apply a new reset pulse 33 across the third and first condensers 3 and 4, thereby reversing the direction of charge in the first condenser 4.

Assume, now, that a second setting pulse 36 having an amplitude E5 and a duration t is applied to the condensers by operating the reversing switch 14. The amplitude E5 of the second setting pulse 36, however, is made approximately one-half that of the amplitude E2 of the first setting pulse 35, as by moving the arm 21 of the potentiometer 20 in an upward direction (as viewed in the drawing). In this case, the amount of change of charge produced in the first condenser 4 is only one-half that produced by the first setting pulse 35. The direction of charge in condenser 4 is changed from saturation in the N direction to a remanent value towards the P direction. A similar change of charge is produced in the third condenser 3 in the direction opposite to that produced in the condenser 4.

When the waveform 37 is next applied, the positive phase 38 produces a change of charge in the condenser 4 which is equal to the amount by which the charge in the condenser 4 was changed from saturation by the second setting pulse 36. A like amount of change of charge is produced in the second condenser 5. The resulting current flowing in the series circuit, including the capacitor 13, consequently is reduced to an amount approximately one-half that produced when a full amplitude setting pulse 35 is applied. Also, a current flow is produced in the series circuit of the first and second condensers 4 and 5 by the negative phase 39 of the waveform 37. Consequently, the output voltage across the capacitor 13 is reduced and thus varies with the amplitude E5 of the setting pulse.

The amplitude of the negative setting pulse can be any value in a continuous range between one specified limit, wherein the charge in the condenser 4 is completely reversed, to another specified limit, wherein no change in the direction of charge of the condenser 4 is produced. Continuing alternating output voltages, of an amplitude corresponding to the amplitudes of the setting pulses across the capacitor 13, are thus obtained.

The operation above described can be understood by considering the charge conditions of the condensers with reference to Fig. 1. When the positive reset pulse 33 is applied, the third condenser 3 is driven to saturation in the P direction and the first and second condensers 4 and 5 are driven to saturation in the N direction with reference to the junction point 25. After the applied voltage is returned to zero, the remanent charge conditions (applied voltage zero) of the condensers 3, 4 and 5 are represented in Fig. 2 by the points 40, 41 and 42 of the hysteresis loops 30, 32 and 34, respectively.

When the positive phase 38 of the waveform 37 is applied across the first and second condensers 4 and 5, there is a voltage acting on each of the condensers 3, 4 and 5. The total applied voltage is indicated in Fig. 2 by the line E3 below the corresponding loops. The applied voltage E3 tends to further saturate the first condenser 4 with charge in the N direction and to change the direction of charge in the second condenser 5 from the N direction to the P direction. In order for a change of charge to occur in the second condenser 5, however, an equal change of charge must also occur in the first condenser 4. Due to the substantially rectangular shape of the loops, substantially no further change of charge is produced in the condenser 4 when it is driven further into saturation along the bottom, flat portion of the loop 32. Accordingly, substantially no change of charge can occur in the condenser 5, and, upon termination of the positive phase 38, the condensers return to the remanent condition of saturation represented by the points 41 and 42, respectively. Note that the applied voltage E3 tends to drive the condenser 3 from the P direction of saturation towards the N direction of saturation along the left branch of the loop 30. The amplitude E3 of the positive phase 38 is limited to a value less than the sum of the coercive voltages of the third condenser 3 and the second condenser 5. Therefore, substantially no change of charge is produced in the third condenser 3. Upon termination of the positive phase 38, the third condenser 3 returns to the remanent condition indicated by the point 40 of the loop 30.

The applied voltage resulting from the following negative phase 39 is indicated in Fig. 2 by the line E4 below each of the loops. The applied voltage E4 tends to change the charge of the first condenser 4 from the N direction of saturation to the P direction of saturation and to change the second condenser 5 even further into saturation in the N direction. Because of the rectangular shape of the loop 34, there is substantially no change of charge produced in the second condenser 5 and, consequently, the charge of the first condenser 4 also can not change. Upon the termination of the negative phase 39, the first two condensers 4 and 5 return to the remanent condition of saturation indicated by the points 41 and 42 of the loops 32 and 34, respectively. Note that the applied voltage E4 tends to drive the condenser 3 further into saturation in the P direction along the upper horizontal portion of the loop 30. However, substantially no change of charge is produced in the condenser 3 due to the rectangular shape of its loop 30. Also, note that the amplitude E4 of the negative phase is not restricted and can be greater than the sum of the coercive voltages of the third condenser 3 and the second condenser 5.

Thus, because substantially no change of charge is produced by either the positive phase 38 or the negative phase 39 of the waveform 37, there is substantially no voltage change produced across the capacitor 13, and the output voltage remains at or close to a zero value. The reset condition may be regarded as a "blocked" response condition wherein the applied A.C. is fully blocked from producing any output voltage.

It is to be understood that the above explanation of the operation is somewhat simplified because the loops for actual ferroelectric material deviate from the ideal rectangular shape assumed. Some small change of charge, therefore, is in fact produced by the waveform 37. Thus, unwanted change can be considered to be a noise voltage which is a common occurrence in electronic circuits. Also, in practice, it is possible to design useful, actual, electrical circuits based on the assumption that the loops of the ferroelectric condensers are perfectly rectangular.

The setting of the system of Fig. 1 to a complete "unblocked" response condition can also be best understood by referring to the loops of Fig. 2. Thus, assume that the reversing switch 14 is operated to apply the negative setting pulse 35. The amplitude E2 exceeds the sum of the coercive voltages of the third and first condensers 3 and 4 but is less than the sum of the coercive voltages of the third and second condensers 3 and 5. The setting pulse 35 drives the third condenser 3 from the remanent condition represented by the point 40 along the upper, left-hand branch of the loop 30 to a condition represented by the point 43. The first condenser 4 is driven from the remanent condition represented by the point 41 along the right-hand branch of the loop 32 to the condition represented by the point 44. Upon termination of the setting pulse 35, the third condenser 3 returns to the remanent condition represented by the point 43a. The first condenser 4 returns to the remanent charge condition represented by the point 46 of the loop 32. The change of charge Q3 in the third condenser 3 is equal to the change of charge Q4 in the first condenser 4 but in the opposite direction.

When the first, positive phase 38 of the waveform 37 is applied across the series circuit, the point representing the condition of the first condenser 4 traverses the left branch of the loop 32 from the remanent saturation point 46 in the P direction to the saturation point 51 in the N direction. The condition of the second condenser 5 is also reversed. The point representing the condition of the second condenser 5 traverses the right-hand branch of the loop 34 from the point 42 representing remanent saturation in the N direction to a saturation point 51a in the P direction. Upon termination of the positive phase 38, the remanent charge condition of the first condenser 4 is represented by the point 41 of the loop 32. The remanent charge condition of the second condenser 5 is represented by the point 45 of the loop 34. The following negative phase 39 of the waveform 37 reverses the charge conditions of the condensers 4 and 5 back to their initial conditions as represented by the points 46 and 42 of the loops 32 and 34, respectively. Subsequent cycles of the A.C. voltage produce equal and opposite changes of charge Q4, Q5 in the condensers 4 and 5, in a similar manner.

A new, reset or blocking pulse 33 can be applied by operating the reversing switch 14 to saturate the condenser 3 with charge in the P direction and the condensers 4 and 5 with charge in the N direction. The reset condition of the condensers is indicated in Fig. 2, as heretofore described, by the points 40, 41 and 42 of the loops 30, 32 and 34, respectively.

To understand how the system of Fig. 1 can be set to any desired value in a continuous range, assume that the reversing switch 14 is operated to apply a reduced amplitude setting pulse 36 to the condensers. The amplitude E5 is limited, conveniently, to a value greater than the sum of the coercive voltages of the condensers 3 and 4 but less than the sum of the coercive voltages of the condensers 3 and 5. The setting pulse 36 drives the third condenser 3 from the remanent state represented by the point 40 along the upper, left-hand branch of the loop 30 to a condition represented by the point 48. At the same time, the first condenser 4 is driven from the remanent condition represented by the point 41 to a condition represented by the point 47 on the right-hand branch of the loop 32. The change of charge ΔQ3 in the third condenser 3 is equal to and in the opposite direction from the change of charge ΔQ4 in the first condenser 4. Upon termination of the setting pulse 36, the third condenser 3 is in the remanent condition represented by the point 49 on a minor loop 30', and the first condenser 4 is in the remanent condition represented by the point 50 on a minor loop 32'. Note that the third and first condensers 3 and 4 return to a remanent condition along a branch of minor unsymmetrical hysteresis loops. In rectangular type materials, the shape of the minor loops is also substantially rectangular, as are the major loops 30 and 32. Consequently, the points 49 and 50 represent "pseudo saturated" conditions, that is, conditions for which the charge does not vary with voltage in a limited range of voltage. Each of these minor unsymmetric loops has a coercive voltage almost equal to that for the major loop under the operation conditions for the system of the present invention.

Assume, now, that the positive phase 38 of the waveform 37 is applied across the first two condensers 4 and 5. The point representing the condition of the first condenser 4 traverses the loop 32' from the point 50 to the left and along the bottom portion of the loop 32 to the point 51 representing saturation in the N direction. Likewise, the point representing the condition of the second condenser 5 traverses the loop 34 from the point 42 along the right branch of the loop 34 to the point 52. Upon termination of the positive phase 38, the first condenser 4 returns to the condition represented by the point 41 of the loop 32, and the condenser 5 goes to the condition represented by the point 53 of minor loop 34'. The change of charge produced in the second condenser 5 is limited by the saturation characteristic of the major loop 32 of the first condenser 4 to an amount equal to that initially produced in the condenser 4 by the setting pulse 36. No further change of charge can be produced in the second condenser 5 because any change must be equal in amount and opposite in direction to the change of charge in the first condenser 4. When the negative phase 39 of the waveform 37 is applied and terminated, the charge in the condenser 5 is changed back to that corresponding to saturation in the N direction, as represented by the point 42 of the loop 34, and the charge in the first condenser 4 is changed by an equal amount towards the P direction to that represented by the point 50 of the loop 32'. The maximum permissible change of charge in the first condenser 4 is limited by the saturation characteristic of the major loop 34 of the second condenser 5 to an equal amount to that initially produced in the condenser 5 by the positive phase 38 of the waveform 37. Repeated applications of the waveform 37 produce equal and opposite changes of charge in the first two condensers 4 and 5.

Each change of charge produces a current flow in the series circuit including the capacitor 13. The A.C. output voltage developed across the capacitor 13, then, is a function of the amplitude of the setting pulse 36. By selecting the amplitude of the setting pulse 36, the charge condition of the first condenser 4 can be set to any remanent charge level between saturation at remanence in the N direction, represented by the point 41, and saturation at remanence in the P direction, represented by the point 46, respectively, of the loop 32.

One manner of considering the above-described operation is to assume that a predetermined amount of charge is trapped in the first condenser 4 by a setting pulse having a predetermined amplitude. The setting can be obtained by any suitable circuit, preferably a constant voltage circuit in which the predetermined voltage amplitude is regulated in accordance with the charge to be trapped. The amount of output voltage produced across the capacitor 13 then varies directly the amount of trapped charge.

The A.C. voltage source 10 may be arranged to furnish cycles of voltage which are symmetrical about a reference point. The A.C. source 10 also may be arranged to furnish a sequence of individual impulses. Each sequence may comprise a positive polarity pulse followed by a negative polarity pulse. The A.C. waveform may be periodic or aperiodic.

An advantageous use of a symmetrical waveform would be in a power amplifier type application wherein it is desired to obtain a relatively large power gain for any one setting impulse. For example, a setting impulse containing a very small energy level traps a predetermined amount of charge in the first condenser 4. The symmetrical A.C. voltage can then be applied across the series circuit, including the capacitor 13, for an indefinite number of cycles. The power gain, then, is the ratio between the total energy produced across the capacitor 13 for the A.C. waveform divided by the energy contained in the setting impulse. Thus, it is seen that the resulting power gain can be as large as desired.

An advantageous use of aperiodic A.C. pulses is in an information-storage type application. For example, the response condition of the condensers 4 and 5, when set by a reset or blocking impulse, may correspond to a binary zero. In this condition, a sequence of A.C. pulses produces substantially no voltage across the capacitor 13. The response condition of the condensers 4 and 5, when set by a suitable amplitude setting or unblocking impulse, then corresponds to a binary one. In this condition, the A.C. pulses each produces a relatively high voltage across the capacitor 13. The sequences of A.C. pulses may be applied repeatedly without the destruction of the stored information. The first two condensers 4 and 5 can be interrogated as many times as desired without requiring any holding power. Also, additional feedback circuitry is not required to restore the information read out by the first interrogating impulse, as is the case with certain prior-art information storage systems.

A desired amount of charge can be trapped in the first condenser 4 by employing setting pulses of the same amplitude but of different durations. A relatively long duration setting pulse operates to trap a relatively large amount of charge.

In the previous discussion, the condensers 4 and 5 were characterized as having different thickness of the ferroelectric dielectric material and correspondingly different coercive voltages. However, condensers having the same coercive voltage may be employed for the condensers 4 and 5. For example, consider the hysteresis loops of Fig. 2 and assume that the loop 34 for the second condenser 5 is made to have the same width along the abscissa as the loop 32 for the first condenser 4. The equal widths of the loops 32 and 34 may correspond to condensers having equal thickness of the dielectric material. The sum of the coercive voltages for the third and first condensers 3 and 4 is now equal to the sum of the coercive voltages for the third and second condensers 3 and 5. When the positive reset pulse is applied, the third condenser 3 is saturated with charge in the P direction and the first two condensers 4 and 5 are saturated with charge in the N direction as before.

Assume, now, that a reduced amplitude, negative setting pulse 36 is applied to the condensers. The charge condition of the third condenser 3 is driven from the point 40 along the left branch of the loop 30 to the point 48 as before. Now, however, both the condensers 4 and 5 are driven from the points 41 and 42 to the points 82 and 84 on the loops 32 and 34, respectively. Upon termination of the control pulse 36, the remanent condition of the third condenser 3 is represented by a point 49 of the minor loop 30', and the remanent conditions of the first two condensers 4 and 5 are represented by the points 83 and 85 of the minor loops 32'' and 34'', respectively. Thus, an equal amount of charge is trapped in the first two condensers 4 and 5, and this amount is equal to one-half that trapped when the condensers 4 and 5 are dissimilar, as described previously. When the negative phase 38 of the waveform 37 is applied, the first condenser 4 is driven to saturation in the N direction, as represented by the point 51 of the loop 32, and the condenser 5 is driven toward saturation in the P direction, as represented by the point 52 of the loop 34'. Upon termination of the positive phase 38, the first two condensers 4 and 5 return to the remanent saturation conditions, as represented by the points 41 and 53 of the loops 32 and 34', respectively. The operation of the system following the first positive phase 38 is then the same as that described for the system of Fig. 1.

Referring to Fig. 3, there is shown an idealized graph of the output voltage produced across the capacitor 13 for different amplitude setting pulses. The abscissa "V" represents the output voltage as a function of the charge "Q" trapped in the condensers 4 or 5 plotted along the ordinate. The relationships set out in the graph of Fig. 3 are derived from the following equation:

(2) $$Q=CV$$

Where C is the value of capacitance of the capacitor 13.

The output voltage across the capacitor 13 varies linearly with the trapped charge Q. The maximum output voltage $V_1$ is produced when the first condenser 4 is saturated with charge $Q_1$ in the P direction, and the condenser 5 is saturated with charge in the N direction. Thus, when the A.C. voltage is applied across the series circuit including the capacitor 13, the output voltage varies linearly with the applied voltage from a zero value, $V_0$ (when the amplitude of the negative phase 38 is less than the sum of the coercive voltages of the condensers 4 and 5) to a maximum value, $V_1$ (when the charge in the condensers 4 and 5 is completely reversed). When an amount of charge less than the maximum amount $Q_1$ is trapped in the condenser 4, the output voltage is reduced correspondingly. For example, for an amount of charge $Q_2$, which may be trapped by the second setting pulse 36, the output voltage reaches a maximum value $V_2$ which is less than the value $V_1$. Thus, the output voltage may be varied from a value $V_0=0$ to a maximum value $V_1$ in accordance with the amplitude of the setting impulses.

It will be understood that the output voltage V can be increased by decreasing the capacitance C of the condenser 13. The output element in series with the condensers 3 and 4 may be an impedance other than the capacitor 13 and may contain a resistive, inductive, or capacitive element, or a combination of these elements. The operation of the system would be carried out in a manner similar to that already described in connection with the capacitor 13. In general, additional impedance elements require a larger amplitude A.C. voltage and larger amplitude setting and reset pulses. Also, there may be phase differences between the current flow in the output element and a current flow through the condensers 4 and 5.

Because the hysteresis loops of the ferroelectric condensers do deviate somewhat from the ideal rectangular shape, the capacitance C of the capacitor 13 is limited preferably to some minimum value. This minimum value of C results from the observation that, in the blocked response condition, there is an unwanted flow of current due to the finite slope of the hysteresis loops of the condensers 4 and 5. In the blocked response condition, the two condensers 4 and 5 may be viewed as presenting a small capacitance to the A.C. pulses. The unwanted flow of current produces an unwanted voltage across the condenser 13. Now, if the capacitance of the condenser 13 is also small, say equal to the small capacitance of the two condensers, the unwanted voltage may be appreciable with respect to the desired voltage produced by a reduced amplitude setting pulse. In order to improve the discrimination between the desired output voltage and the unwanted output voltage, then, the capacitance of the condenser 13 should be larger than, say twice, the small capacitance presented by the two condensers 4 and 5. Although the applied A.C. is indicated to be sinusoidal, it is understood that the A.C. may be non-sinusoidal and may include an asymmetrical drive wherein the amplitude E3 is greater than the amplitude E4. The applied A.C. also may consist of individual pulses with the polarity alternating with each succeeding pulse.

Referring to Fig. 4, there is shown a modification of the invention in which the setting and resetting impulses are applied to the pair of condensers 4 and 5 by means of unilateral conducting devices such as the diodes 60 and 62. The diode 60 is biased to be non-conductive by a battery 64 connected between ground and the junction of a setting pulse source 67 and one terminal of a resistor 65. The other terminal of the resistor 65 is connected to the cathode of the diode 60. The setting pulse source 67 is adapted to apply the negative setting pulses to the condensers 4 and 5 through the diode 60. The diode 62 is connected in parallel with the diode 60 to the condensers 4 and 5. The diode 62 is biased to be non-conductive by a battery 68 connected between ground and the junction of a reset pulse source 70 and one terminal of a resistor 69. The other terminal of the resistor 69 is connected to the anode of the diode 62. The reset pulse source 70 is adapted to furnish the positive reset pulses to the condensers 4 and 5 through the diode 62. The A.C. voltage source 10 is connected in series with the capacitor 13 and the condensers 4 and 5 to the common ground.

The operation of the system of Fig. 4 is similar to that of the system of Fig. 1. First, let a positive reset pulse be applied from the reset pulse source 70 through the resistor 69 and the diode 62. Both condensers 4 and 5 are saturated in the same polarity with respect to the junction 25. The A.C. source 10 cannot cause a change in the charge of either of these condensers 4 and 5.

Next, let a negative setting pulse be applied from the setting source 67. The amplitude of this setting pulse is less than that required to exceed the coercive force of one of the condensers 4 and 5, but not the other. Hence, one condenser stores a charge in a polarity negative with respect to the junction 25, and the other one stores a charge in a polarity positive with respect to the junction 25. Now the A.C. source can cause changes in the charge on each condenser, the change in charge of one of the condensers 4 and 5 being balanced by the change in charge in the other of the condensers 4 and 5.

Note that the voltage excursion of the point 25 when the A.C. voltage is applied alternates between the positive and negative polarities when the system is set to a desired response level. For example, assume a setting pulse such as the pulse 36 of Fig. 1 is applied. The negative phase of the A.C. changes the first condenser 4 from the condition represented by a point 50 of the hysteresis loop 32' to the condition represented by the point 51. The positive phase of the A.C. then changes the first condenser 4 from the condition represented by the point 51 back to the condition represented by the point 50. Similar but opposite changes occur in the second condenser 5. Therefore, the voltage of the point 25 alternates above and below ground potential. By suitable biasing the diodes 60 and 62, the impedance of the circuit connected in parallel to the junction point 25 appears to be very high in the range of the maximum A.C. voltage excursion of the point 25. Accordingly, the diodes 60 and 62 do not affect the charge reversal of the condensers 4 and 5 to any appreciable degree.

The setting and reset pulses may be applied to the condensers 4 and 5 through a pair of coupling capacitors 73 and 75, as shown in Fig. 5. A positive D.C. bias source 77 is connected in series with the resistor 65 to the cathode of the diode 60. The setting pulse source 67 is coupled by the first coupling capacitor 73 to the junction between the resistor 65 and the diode 60. A negative D.C. bias source 79 is connected in series with the resistor 69 to the anode of the diode 62. The reset pulse source 70 is coupled by the second coupling capacitor 75 to the junction between the resistor 69 and the diode 62. Each setting pulse is coupled by the capacitor 73 and the diode 60 to the condensers 4 and 5. Also, each setting pulse is coupled by the capacitor 73, the resistor 65 and the bias source 77 to ground. Each reset pulse is coupled through the capacitor 75 and the diode 62 to the condensers 4 and 5. Also, each reset pulse is coupled by the capacitor 75, the resistor 69 and the bias source 79 to ground. The RC time constant of the capacitor 73 and the resistor 65 may be the same as the RC time constant of the capacitor 75 and the resistor 69. The maximum repetition rate at which the system is operated is determined by the RC time constant of a coupling capacitor and its series resistor. Thus, a setting pulse is not applied until the previous reset pulse energy has dissipated itself across the resistor 69. In the system of Fig. 5, it is preferable to delay applying the A.C. voltage for the time required for the capacitor 73 to discharge through the resistor 65. The delay insures that the system has been set to the desired response level.

There have been described herein novel electrical systems useful for controlling an alternating input voltage in accordance with either the amplitudes or the durations of individual setting impulses. The input voltage is controlled over a continuous range of response levels by employing condensers having a dielectric of ferroelectric material. No holding power is required for maintaining a given response level obtained by once applying a suitable setting impulse. An output voltage having a predetermined amplitude can be obtained for an indefinitely long time in accordance with one single setting impulse.

What is claimed is:

1. An electrical system comprising at least two condensers connected in series, each of said condensers being characterized by charge saturation and charge remanence substantially equal to said charge saturation, means for applying a saturating voltage to a junction point between two of said condensers to saturate said condensers with charge in the same one direction with reference to said junction point, and means for applying to said condensers in parallel two or more control impulses having differing amplitudes for changing the charge of at least one of said condensers by a predetermined amount in accordance with the amplitudes of said control impulses.

2. An electrical system as recited in claim 1 wherein the coercive voltage of one of said two condensers is different from that of the other of said condensers.

3. An electrical system as recited in claim 1 wherein the coercive voltage of said two condensers is substantially the same.

4. An electrical system as recited in claim 1 including means for applying a voltage alternating in polarity to said condensers in series.

5. An electrical system as recited in claim 1 including means for applying an alternating voltage to said condensers in series, one of the phases of said alternating voltage having a larger amplitude than the other phase.

6. An electrical system comprising at least three condensers each having a dielectric of ferroelectric material, and each characterized by remanent and saturated charges of substantially equal values, a first and a second of said condensers being connected in series with each other, said third condenser being connected to a junction point between said first and second condensers, means for applying a saturating voltage of one polarity to said third condenser to saturate said first and second condensers with charge in the same one direction with reference to said junction point, and to saturate said third condenser with charge in the opposite direction with reference to said junction point, and means for applying setting impulses of the opposite polarity to said third condenser to thereby reduce the charge in said third condenser by a predetermined amount in accordance with the amplitude of said setting impulses.

7. An electrical system as recited in claim 6 wherein the coercive voltage for said third condenser is greater than the coercive voltage for either of said first and said second condensers.

8. An electrical system comprising at least two condensers connected in series, each of said condensers being characterized by charge saturation and charge remanence substantially equal to said charge saturation, means for applying a saturating voltage to a junction point between said two condensers to saturate said two condensers with charge in the same one direction with reference to said two junction points and means for applying to said two condensers in parallel two or more control impulses having differing durations to change the charge of at least one of said condensers by a predetermined amount in accordance with the duration of said control impulses.

9. An electrical system as recited in claim 6 including an output element connected in series to said first and second condensers.

10. An electrical system as recited in claim 6 wherein the coercive voltage for said third condenser is greater than the coercive voltages for either of said first and said second condensers, and the coercive voltage for said second condenser is greater than the coercive voltage for said first condenser.

11. An electrical system comprising at least two ferroelectric condensers connected in series, each said condensers being characterized by a remanent charge at zero applied voltage, said remanent charge being any value in a continuous range limited by a positive maximum value and a negative maximum value, and each said condenser being characterized further by positive and negative saturated values of charge substantially equal respectively to said positive and negative maximum values, means for applying a first voltage impulse of one polarity to the junction between said condensers to set at least one of said two condensers to one of said maximum remanent charge values, and setting means for applying selectively a second voltage impulse of the opposite polarity to said junction to set the other of said two condensers to a predetermined value of remanent charge in said continuous range.

12. An electrical system comprising first and second ferroelectric condensers connected in series and a third ferroelectric condenser connected to a junction point intermediate said first and second condensers, each said condenser being characterized by a remanent charge at zero applied voltage, said remanent charge being any value in a continuous range limited by a positive and a negative maximum value, and each said condenser being characterized further by positive and negative saturated values of charge substantially equal respectively to said positive and negative maximum values, means for applying a voltage of one polarity across said third and first condensers and also across said third and second condensers for setting said third condenser to one of said positive remanent charge values and for setting said first and second condensers to one of said negative remanent charge values, and means for applying selectively a voltage of the polarity opposite to said one polarity across said third and first condensers and also across said third and second condensers to change at least one of said first and second condensers to either a positive remanent value or a different negative remanent charge value.

13. An electrical system as recited in claim 12 wherein the coercive voltages for said first and second condensers are different.

14. An electrical impulse operable ferroelectric device for controlling the transmission of alternating electrical signals in accordance with the amplitude of an electrical impulse comprising at least two ferroelectric condensers connected in series, means for applying said alternating electrical signals across said condensers in series, and means for applying selectively electrical impulses of varying amplitudes to a junction intermediate said condensers.

15. A ferroelectric device having electrical response conditions variable over a continuous range to alternating electrical signals, said device including two series-connected ferroelectric condensers, means for applying an electrical impulse of one polarity to said condensers, thereby causing said device to be operable to block said alternating signals in a first of said response conditions, and means for applying electrical impulses of the opposite polarity to said condensers, thereby causing said device to be operable to transmit at least a portion of said alternating signals in the remaining ones of said response conditions.

16. A ferroelectric device having a plurality of electrical response conditions variable over a continuous range to alternating electrical signals, said device including two series-connected ferroelectric condensers, and means for applying to said condensers electrical impulses to render said device operable to block said alternating signals in a first of said response conditions and to transmit at least a portion of said alternating signals in the remaining ones of said response conditions.

References Cited in the file of this patent

UNITED STATES PATENTS

| | | |
|---|---|---|
| 2,666,195 | Bachelet et al. | Jan. 12, 1954 |
| 2,695,396 | Anderson | Nov. 23, 1954 |

OTHER REFERENCES

"Multi-Stable Magnetic Memory Techniques," John D. Goodell, Radio-Electonic Engineering, December 1951.

UNITED STATES PATENT OFFICE
CERTIFICATE OF CORRECTION

Patent No. 2,900,622

August 18, 1959

Jan A. Rajchman et al.

It is hereby certified that error appears in the printed specification of the above numbered patent requiring correction and that the said Letters Patent should read as corrected below.

Column 13, line 3, after the word "said" strike out "two"; column 14, lines 5 and 6, for "positive remanent value" read -- positive remanent charge value --; line 7, strike out "charge value".

Signed and sealed this 16th day of February 1960.

(SEAL)
Attest:

KARL H. AXLINE
Attesting Officer

ROBERT C. WATSON
Commissioner of Patents